US012304508B2

(12) United States Patent
Maeda et al.

(10) Patent No.: US 12,304,508 B2
(45) Date of Patent: May 20, 2025

(54) ELECTRONIC CONTROL DEVICE AND VEHICLE CONTROL METHOD

(71) Applicant: Hitachi Astemo, Ltd., Hitachinaka (JP)

(72) Inventors: Koji Maeda, Ibaraki (JP); Kenji Kogo, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 228 days.

(21) Appl. No.: 17/928,126

(22) PCT Filed: Feb. 5, 2021

(86) PCT No.: PCT/JP2021/004268
§ 371 (c)(1),
(2) Date: Nov. 28, 2022

(87) PCT Pub. No.: WO2021/255985
PCT Pub. Date: Dec. 23, 2021

(65) Prior Publication Data
US 2023/0202494 A1    Jun. 29, 2023

(30) Foreign Application Priority Data
Jun. 16, 2020   (JP) .................. 2020-103944

(51) Int. Cl.
*B60W 50/023*   (2012.01)
*B60W 60/00*    (2020.01)

(52) U.S. Cl.
CPC .... *B60W 50/023* (2013.01); *B60W 60/00186* (2020.02)

(58) Field of Classification Search
CPC . B60W 50/023; B60W 60/00186; B62D 5/04; B62D 6/00
(Continued)

(56) References Cited

U.S. PATENT DOCUMENTS

2019/0066399 A1*  2/2019  Jiang .................. G07C 5/008
2019/0263425 A1*  8/2019  Kanoh ................. B60W 50/14
(Continued)

FOREIGN PATENT DOCUMENTS

JP    2019-121043    *  7/2019
JP    2019-121043 A     7/2019
(Continued)

OTHER PUBLICATIONS

English Translation of International Search Report issued in corresponding International Application No. PCT/JP2021/004268, dated May 18, 2021.

*Primary Examiner* — Muhammad Shafi
(74) *Attorney, Agent, or Firm* — Foley & Lardner LLP

(57) ABSTRACT

Cost is reduced when a duplication configuration including up to a power supply is adopted. An in-vehicle electronic control device that executes calculation processing of vehicle control using information acquired by an external sensor includes: a first calculation unit that executes the calculation processing; and a second calculation unit that is communicably connected to the first calculation unit, in which the first calculation unit and the second calculation unit are supplied with power from different power supplies, and execute calculation processing of vehicle control that is different from each other in a normal state, the first calculation unit outputs an action plan of a vehicle, the second calculation unit outputs a signal to be input to an actuator for operating a vehicle, and when the first calculation unit or the second calculation unit fails, a calculation unit in a normal state executes calculation processing of degenerated vehicle control.

5 Claims, 3 Drawing Sheets

(58) Field of Classification Search
USPC .......................................................... 701/23
See application file for complete search history.

(56) References Cited

U.S. PATENT DOCUMENTS

| | | |
|---|---|---|
| 2019/0312449 A1 | 10/2019 | Matsushita |
| 2021/0146953 A1 | 5/2021 | Horita et al. |

FOREIGN PATENT DOCUMENTS

| | | | |
|---|---|---|---|
| JP | 2019-152896 A | | 9/2019 |
| JP | 2019-175354 A | | 10/2019 |
| JP | 2019-187062 | * | 10/2019 |
| JP | 2019-187062 A | | 10/2019 |
| JP | 2020-015482 | * | 1/2020 |
| JP | 2020-015482 A | | 1/2020 |

* cited by examiner

ELECTRONIC CONTROL DEVICE AND VEHICLE CONTROL METHOD

TECHNICAL FIELD

The present invention relates to a configuration of an in-vehicle electronic control device that achieves autonomous driving.

BACKGROUND ART

Recently, with an increase in calculation capability of an in-vehicle microcomputer, autonomous driving of Level 3 or higher has been achieved. In autonomous driving of Level 3 or higher, driving responsibility is transferred from the driver to the system. Therefore, in the global technical regulation set forth by the United Nations Economic Commission for Europe (UN/ECE), it is necessary to duplicate a system including up to a power supply at autonomous driving Level 3 or higher.

Background arts in this technical field include JP 2019-187062 A (PTL 1). JP 2019-187062 A describes a redundant power supply system in which a predetermined power is supplied to a first battery and a first load in a primary system via a first DCDC converter (DDC), and the predetermined power is supplied to a second battery and a second load in a secondary system which is independent of the primary system, via a second DDC, the redundant power supply system includes: a first switching element inserted between the second DDC and the second battery; a first diode connected in parallel with the first switching element and rectifying from the second battery toward the second DDC; and a control section that turns off the first switching element when in a first state where an amount of charge of the second battery is equal to or greater than a predetermined first threshold and turns on the first switching element when in a state other than the first state.

CITATION LIST

Patent Literature

PTL 1: JP 2019-187062 A

SUMMARY OF INVENTION

Technical Problem

As described above, JP 2019-187062 A discloses an example of duplication of an autonomous driving system including up to a power supply. In this example, one power supply and one autonomous driving ECU are provided for each of normal time and abnormal time. The backup power supply for abnormal time is charged at normal time, and the vehicle travels by the backup power supply and the backup autonomous driving ECU at the abnormal time of the main power supply.

In this system, the two autonomous driving ECUs operate exclusively, and therefore the backup autonomous driving ECU does not operate at the normal time. If the objective is degeneration operation of stopping autonomous driving and stopping the vehicle at a safe place (road shoulder or the like) in the event of system abnormality, it is a problem that the system cost of this method is very high.

FIG. 1 illustrates a circuit configuration of a general autonomous driving system. Since autonomous driving in some sections and driving by a human in other sections coexist, a vehicle may be mounted with an advanced driving assistance system and an autonomous driving system.

External information is input to an autonomous driving ECU 103 from an autonomous driving sensor 101. On the other hand, external information is input to an advanced driving assistance system ECU 104 from a driving assistance system sensor 102. The autonomous driving ECU 103 and the advanced driving assistance system ECU 104 are communicably connected, and the external information processed by the advanced driving assistance system ECU 104 is transmitted to the autonomous driving ECU 103 and integrated with the external information processed by the autonomous driving ECU 103. The autonomous driving ECU 103 estimates an own vehicle position using the integrated external information, creates an action plan, and transmits the action plan to a vehicle control ECU 105. The vehicle control ECU 105 transmits a control signal to a main actuator 111 to control the main actuator 111. The main actuator 111 includes a motor controller 106, a steering controller 107, and a brake controller 108, and controls the vehicle according to the action plan.

Using the external information input from the driving assistance system sensor 102, the advanced driving assistance system ECU 104 estimates the own vehicle position, creates an action plan for driving assistance, and transmits the action plan to the vehicle control ECU 105. The vehicle control ECU 105 transmits a control signal to a redundant actuator 112 to control the redundant actuator 112. The redundant actuator 112 includes a redundant steer controller 109 and a redundant brake controller 110. When at least one of the autonomous driving ECU 103 and the vehicle control ECU 105 fails, the advanced driving assistance system ECU 104 executes calculation for degeneration operation such as low-speed travel or road shoulder stop using the external information acquired by the driving assistance system sensor 102, and controls the redundant actuator 112.

When the advanced driving assistance system ECU 104 fails, the autonomous driving ECU 103 executes not an autonomous driving control program executed at normal time but a degeneration control program, creates an action plan by calculation for degeneration operation such as low-speed travel or road shoulder stop using only the external information acquired by the autonomous driving sensor 101, and transmits the action plan to the vehicle control ECU 105.

In order to make the power supply supplied to each unit of the autonomous driving system redundant, two power supplies, a power supply 1 and a power supply 2, are supplied to the autonomous driving system. The power supply 1 is supplied to the autonomous driving ECU 103, the vehicle control ECU 105, and the main actuator 111, and the power supply 2 is supplied to the advanced driving assistance system ECU 104 and the redundant actuator 112. Even when either power supply becomes abnormal, the above-described degeneration operation can be performed by the autonomous driving ECU 103 or the advanced driving assistance system ECU 104. A high-voltage power supply of several hundred volts is supplied to the motor of the main actuator 111 as a power supply 0.

This configuration is lower in cost than the configuration presented in PTL 1 because two ECUs perform separate calculations at normal times. However, since there are two ECUs, there is a problem that a component cost and a manufacturing cost are high.

Solution to Problem

A representative example of the invention disclosed in the present application is as follows. That is, an in-vehicle electronic control device that executes calculation processing of vehicle control using information acquired by an external sensor includes: a first calculation unit that executes the calculation processing; and a second calculation unit that is communicably connected to the first calculation unit, in which the first calculation unit and the second calculation unit are supplied with power from different power supplies, and execute calculation processing of vehicle control that is different from each other in a normal state, the first calculation unit outputs an action plan of a vehicle, the second calculation unit outputs a signal to be input to an actuator for operating a vehicle, and when the first calculation unit or the second calculation unit fails, a calculation unit in a normal state executes calculation processing of degenerated vehicle control.

Advantageous Effects of Invention

According to one aspect of the present invention, component cost and manufacturing cost can be reduced in a case of adopting the duplication configuration including up to a power supply satisfy specifications of autonomous driving of Level 3 or higher. Problems, configurations, and effects other than those described above will be made clear by the description of the following examples.

DESCRIPTION OF EMBODIMENTS

Figure 1:
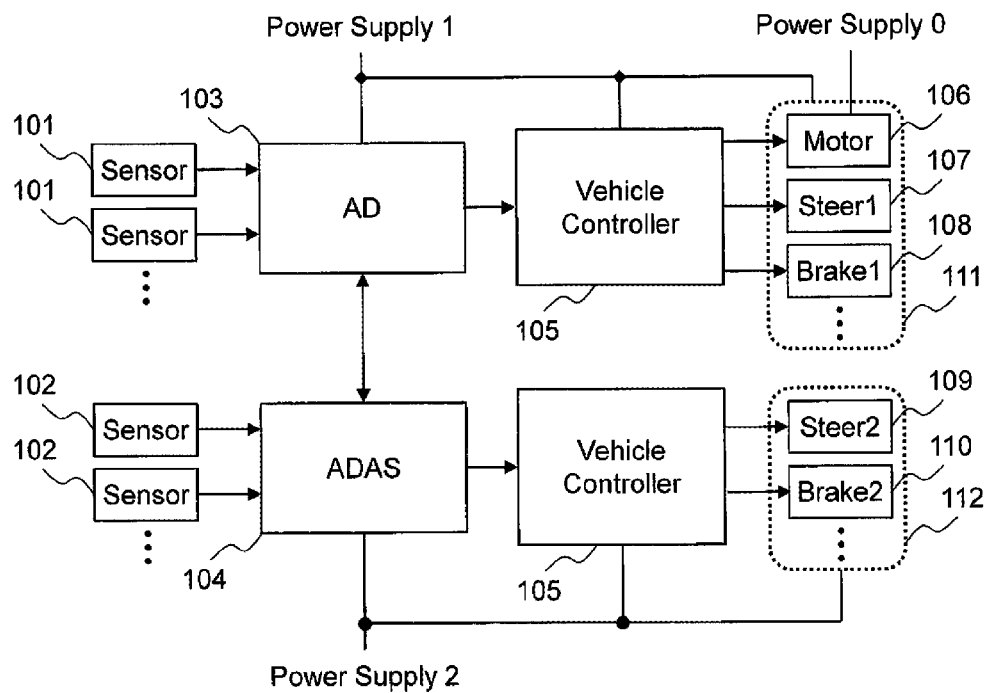
FIG. 1 is a block diagram illustrating a circuit configuration of a general autonomous driving system.

An embodiment will be described in detail with reference to the drawings. However, the present invention is not to be construed as being limited to the description content of the embodiment described below. Those skilled in the art can easily understand that the specific configuration can be changed without departing from the spirit or gist of the present invention.

In the configuration of the invention described below, same reference signs are commonly used for the same parts or parts having similar functions among different drawings, and redundant description may be omitted.

In a case where there is a plurality of elements having the same or similar functions, the same reference signs may be attached with different subscripts for description. However, in a case where it is not necessary to distinguish a plurality of elements, subscripts may be omitted.

Descriptions such as "first", "second", and "third" in the present description and the like are attached to identify constituent elements, and do not necessarily limit the number, order, or content thereof. Numbers for identifying constituent elements are used for each context, and numbers used in one context do not necessarily indicate the same configurations in another context. It does not prevent a constituent element identified by a certain number from functioning also as a constituent element identified by another number.

In order to facilitate understanding of the invention, positions, sizes, shapes, ranges, and the like of components illustrated in the drawings and the like do not always represent actual positions, sizes, shapes, ranges, and the like. Therefore, the present invention is not necessarily limited to the positions, sizes, shapes, ranges, and the like disclosed in the drawings and the like.

The publications, patents, and patent applications cited in the present description constitute a part of the description of this description as it is.

Constituent elements expressed in the singular form in the present description are intended to include the plural form unless otherwise clearly indicated in the context.

In the present description, the calculator is described as a microcomputer, but may be replaced with another calculator such as an FPGA or a GPU.

Example 1

Figure 2:
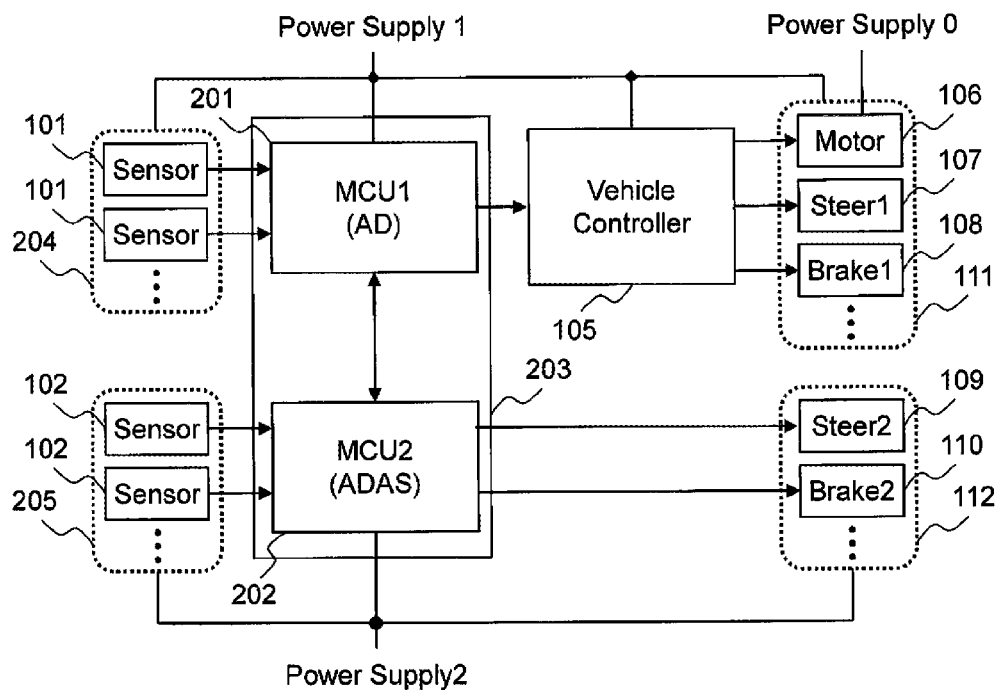
FIG. 2 is a block diagram illustrating a circuit configuration of an autonomous driving system of Example 1.

FIG. 2 is a block diagram illustrating the circuit configuration of the autonomous driving system of Example 1 of the present invention.

An autonomous driving electronic control device (ECU) 203 of the present example has two or more micro controller units (MCUs). Here, an example including two MCUs of an MCU 1 (201) and an MCU 2 (202) will be described. The MCU 1 (201) and the MCU 2 (202) may be a plurality of electronic components housed in different packages or may be configured by a plurality of processor cores mounted in one package. The MCU 1 (201) and the MCU 2 (202) is preferably implemented in one housing.

External information is input to the MCU 1 (201) from the autonomous driving sensor 101. On the other hand, external information is input to the MCU 2 (202) from the driving assistance system sensor 102.

The MCU 1 (201) and the MCU 2 (202) are communicably connected, and the external information processed by the MCU 2 (202) is transmitted to the MCU 1 (201) and integrated with the external information processed by the MCU 1 (201). The MCU 1 (201) estimates the own vehicle position using the integrated external information, creates an action plan, and transmits the action plan to the vehicle control ECU 105. The vehicle control ECU 105 transmits a control signal for achieving the action plan to the main actuator 111 and controls the main actuator 111. The main actuator 111 includes the motor controller 106, the steering controller 107, and the brake controller 108, and controls the vehicle according to the action plan. In this manner, the MCU 1 (201) constitutes an autonomous driving system (AD) having a driving automation Level 3 or higher.

The MCU 2 (202) is configured to be able to control the redundant actuator 112. The redundant actuator 112 includes the redundant steer controller 109 and the redundant brake controller 110. The MCU 2 (202) executes calculation for driving assistance using the external information acquired by the driving assistance system sensor 102, and controls the redundant actuator 112. In this manner, the MCU 2 (202) constitutes an advanced driving assistance system (ADAS) having a driving automation level of 2 or lower, and provides driving assistance functions such as adaptive cruise control and collision damage reduction braking control.

When at least one of the MCU 1 (201) and the vehicle control ECU 105 fails, the MCU 2 (202) executes calculation for degeneration operation such as low-speed travel or road shoulder stop using the external information acquired by the driving assistance system sensor 102, and controls the redundant actuator 112. In this case, the MCU 2 (202) may execute a degeneration control program different from the driving assistance program that is normally executed, and execute calculation for the degeneration operation. In this case, the MCU 2 (202) may search for a safe stop location with reference to only map information, and control the redundant actuator 112 so as to stop at the location.

When the MCU 2 (202) fails, the MCU 1 (201) executes not an autonomous driving control program executed at normal time but a degeneration control program, creates an action plan by calculation for degeneration operation such as low-speed travel or road shoulder stop using only the external information acquired by the autonomous driving sensor 101, and transmits the action plan to the vehicle control ECU 105.

When the entire function (that is, both the MCU 1 (201) and the MCU 2 (202)) of the autonomous driving ECU 203 fails, the vehicle control ECU 105 outputs, to the main actuator 111, a control signal for safely stopping, with reference to only map information.

When the MCU 2 (202) is operating as an advanced driving assistance system, the MCU 1 (201) may execute calculation processing for monitoring whether the MCU 2 (201) is operating normally.

In order to make the power supply supplied to each unit of the autonomous driving system redundant, two power supplies, the power supply 1 and the power supply 2, are supplied to the autonomous driving system. The power supply 1 and the power supply 2 may be power supply supplied from different auxiliary batteries or power supply supplied from different power supply circuits connected to one auxiliary battery. When power supply is supplied from different auxiliary batteries, power supply is preferably supplied from different types (for example, a lead battery, a lithium ion battery, a nickel hydrogen battery, or the like) of auxiliary batteries. The power supply 1 is supplied to an autonomous driving sensor group 204, the MCU 1 (201), the vehicle control ECU 105, and the main actuator 111 configured by the autonomous driving sensor 101, and the power supply 2 is supplied to a driving assistance sensor group 205, the MCU 2 (202), and the redundant actuator 112 configured by the driving assistance system sensor 102. Even when any of the power supplies becomes abnormal, the above-described degeneration operation can be performed by the MCU 1 (201) or the MCU 2 (202). A high-voltage power supply of several hundred volts is supplied to the motor of the main actuator 111 as a power supply 0.

Functions implemented in the MCU 1 (201) and the MCU 2 (202) will be described. The autonomous driving sensor 101 is a sensor capable of highly accurate sensing, such as a high-resolution camera, a surround view camera, or LiDAR. Using output of the autonomous driving sensor 101, the MCU 1 (201) executes surround processing, fusion processing between the camera and the LiDAR, recognition processing, and the like. The recognition processing may be executed by AI. On the other hand, the driving assistance system sensor 102 is a sensor with relatively low cost and high reliability, such as a low-resolution camera and a radar. Using output of the driving assistance system sensor 102, the MCU 2 (202) executes integration processing of a plurality of radars, fusion processing of integrating radar output and a camera image, and the like. The fusion result of the radar and the camera calculated by the MCU 2 (202) is transmitted to the MCU 1 (201) and integrated with the external information processed by the MCU 1 (201).

When the entire autonomous driving ECU 203 is damaged or fails due to an impact, a lightning strike, or the like, the vehicle control ECU 105 controls the vehicle. The vehicle control ECU 105 may be connected to a map unit having map information. When the entire function of the autonomous driving ECU 203 fails, the vehicle control ECU 105 outputs, to the main actuator 111, a control signal for safely stopping, with reference to the map information. Although not illustrated, output signals from the autonomous driving sensor 101 and the driving assistance system sensor 102 may be branched via an Ethernet switch or the like and input to the vehicle control ECU 105. In this case, when the entire function of the autonomous driving ECU 203 fails, the vehicle control ECU 105 specifies the own vehicle position using sensor information and executes degeneration control.

Example 2

Figure 3:
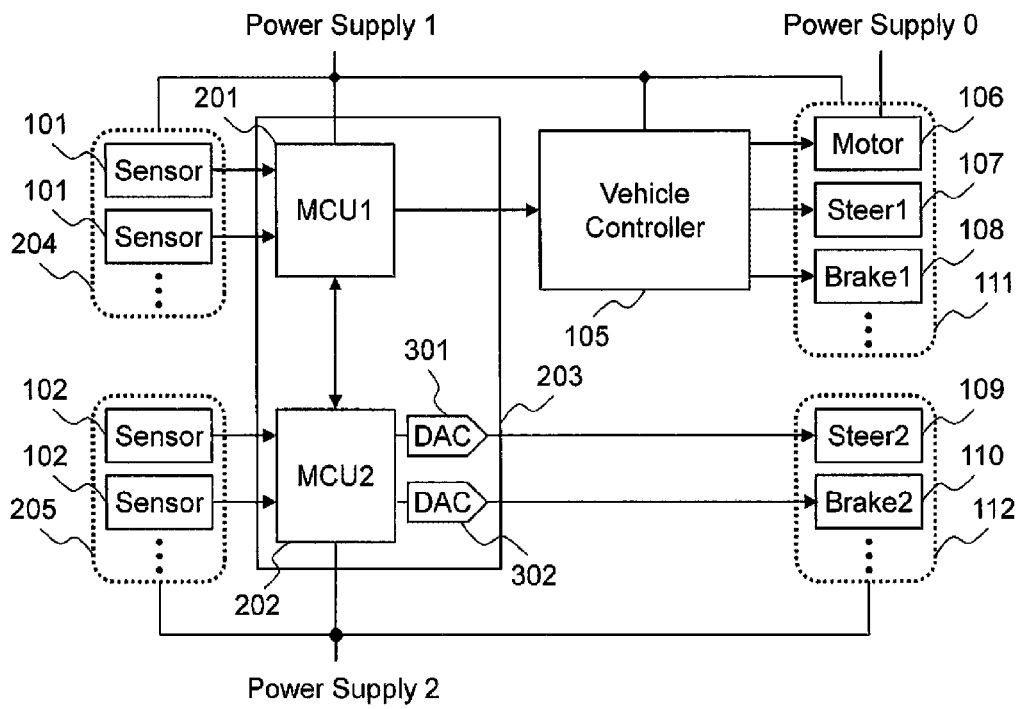
FIG. 3 is a block diagram illustrating a circuit configuration of an autonomous driving system of Example 2.

FIG. 3 is a block diagram illustrating the circuit configuration of the autonomous driving system of Example 2 of the present invention. In Example 2, differences from Example 1 will be mainly described, and the same configurations and functions as those of Example 1 will be denoted by the same reference signs, and their descriptions will be omitted.

In Example 1, the MCU 2 (202) controls the redundant actuator 112, but an input signal to the actuator controlled by hydraulic pressure or the like is an analog signal, and there is a case where the MCU 2 (202) does not have an analog signal output function. In this case, digital-analog converters 301 and 302 are connected to the output of the MCU 2.

Example 3

Figure 4:
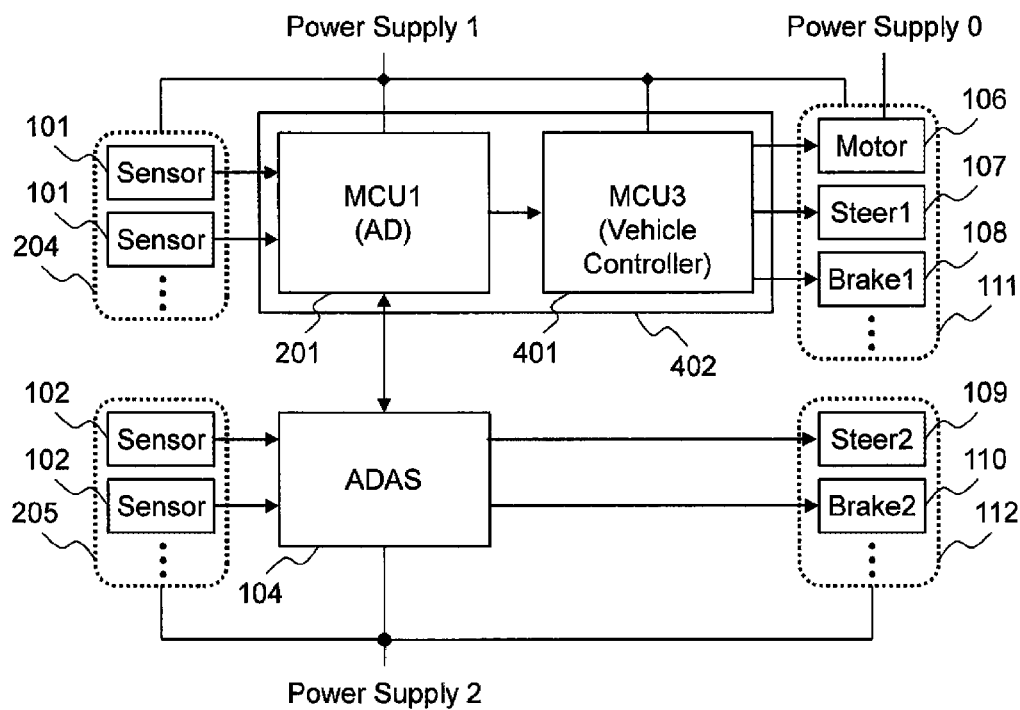
FIG. 4 is a block diagram illustrating a circuit configuration of an autonomous driving system of Example 3.

FIG. 4 is a block diagram illustrating the circuit configuration of the autonomous driving system of Example 3 of the present invention. In Example 3, differences from Example 1 will be mainly described, and the same configurations and functions as those of Example 1 will be denoted by the same reference signs, and their descriptions will be omitted.

Example 1 presents an example in which the autonomous driving control system (AD) and the advanced driving assistance system (ADAS) are implemented in one housing, meanwhile in Example 3, the MCU 1 (201) and the vehicle control ECU 105 that achieve the autonomous driving control system (AD) are implemented in one housing 402. A vehicle control program is implemented on an MCU 3 (401) that achieves the vehicle control ECU, and the control of the vehicle is finally determined. For example, a highly reliable microcomputer equivalent to ASIL-D is preferably used for the MCU 3 (401). The MCU 3 (401) may execute calculation processing of monitoring whether the MCU 1 (201) or the ADAS 104 is normally operating.

Example 4

Figure 5:
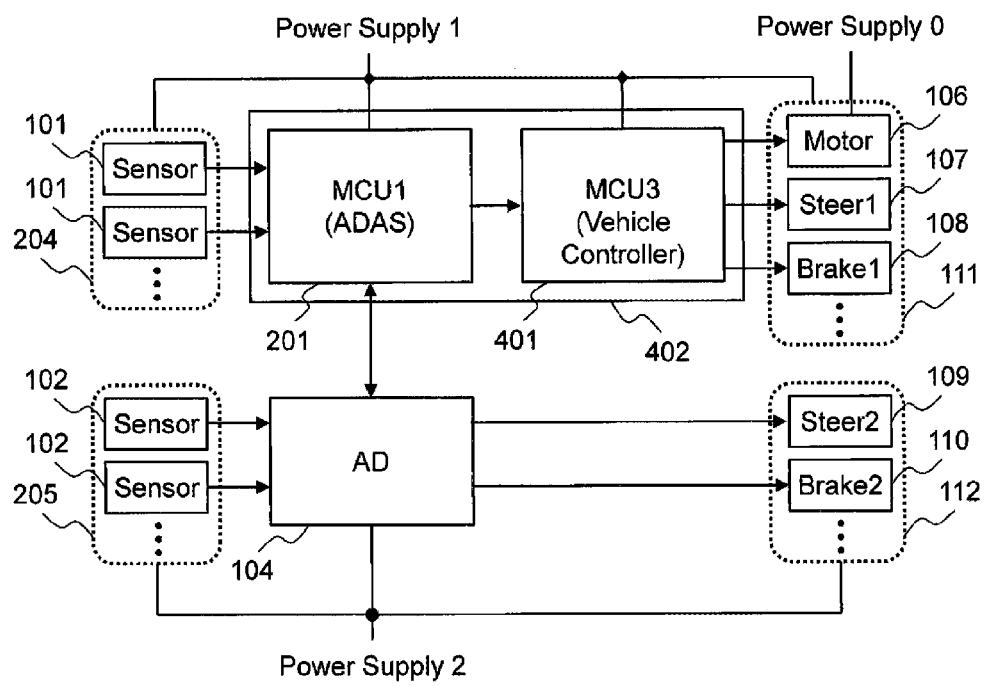
FIG. 5 is a block diagram illustrating a circuit configuration of an autonomous driving system of Example 4.

FIG. 5 is a block diagram illustrating the circuit configuration of the autonomous driving system of Example 4 of the present invention. In Example 4, differences from Example 1 will be mainly described, and the same configurations and functions as those of Example 1 will be denoted by the same reference signs, and their descriptions will be omitted.

Example 1 presents an example in which the autonomous driving control system (AD) and the advanced driving assistance system (ADAS) are implemented in one housing, meanwhile, in Example 4, the MCU 1 (201) and the vehicle control ECU 105 that achieve the advanced driving assistance system (ADAS) are implemented in the one housing 402.

A vehicle control program is implemented on the MCU 3 (401) that achieves the vehicle control ECU, and the control of the vehicle is finally determined. For example, a highly reliable microcomputer equivalent to ASIL-D is preferably used for the MCU 3 (401). The MCU 3 (401) may execute calculation processing of monitoring whether the MCU 1 (201) or the ADAS 104 is normally operating.

Example 5

Figure 6:
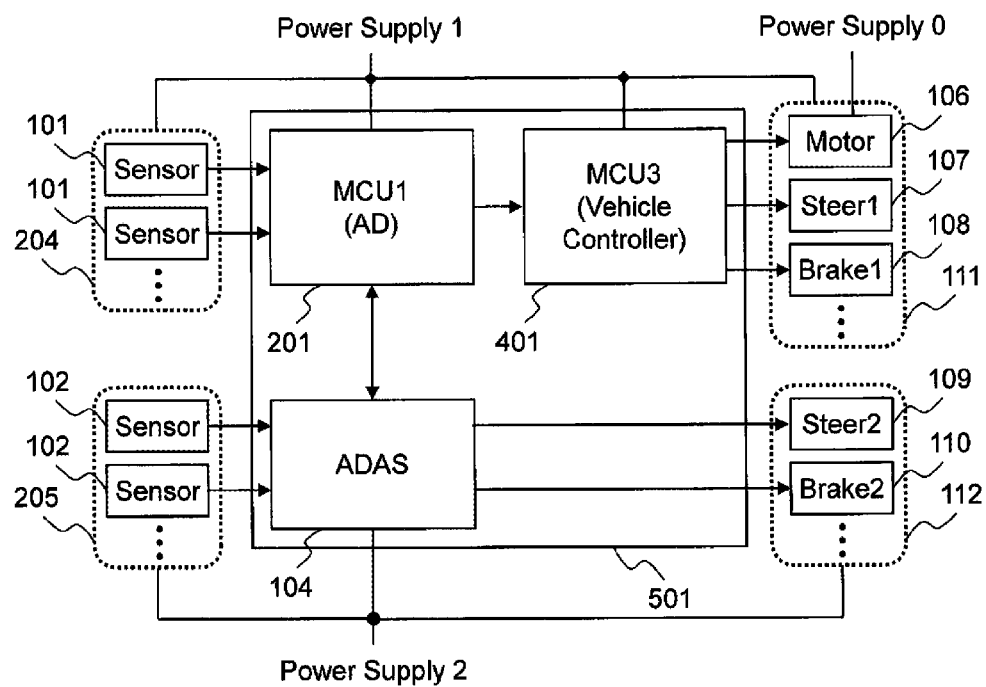
FIG. 6 is a block diagram illustrating a circuit configuration of an autonomous driving system of Example 5.

FIG. 6 is a block diagram illustrating the circuit configuration of the autonomous driving system of Example 5 of the present invention. In Example 5, differences from Example 1 will be mainly described, and the same configurations and functions as those of Example 1 will be denoted by the same reference signs, and their descriptions will be omitted.

Example 1 presents an example in which the autonomous driving control system (AD) and the advanced driving assistance system (ADAS) are implemented in one housing, meanwhile, in Example 5, the autonomous driving control system (AD), the advanced driving assistance system (ADAS), and the vehicle control ECU 105 are implemented in one housing 501. The vehicle control ECU is achieved by the MCU 3 (401). As in Example 2, a digital-analog converter DAC may be connected between the ADAS 104 and the redundant actuator 112 as necessary.

As described above, the electronic control device (autonomous driving ECU 203) of the examples of the present invention includes the MCU 1 (201) (first calculation unit) that executes calculation processing, and the MCU 2 (202) (second calculation unit) that is communicably connected to the MCU 1 (201), in which the MCU 1 (201) and the MCU 2 (202) are supplied with power from different power supplies (power supply 1 and power supply 2), and in a normal state, each executes calculation processing (for example, AD and ADAS) of vehicle control different from each other, the MCU 1 (201) outputs an action plan of a vehicle, the MCU 2 (202) outputs a signal to be input to the redundant actuator 112 for operating the vehicle, and in a case where the MCU 1 (201) or the MCU 2 (202) fails, since an MCU in the normal state executes calculation processing of degenerated vehicle control, the two MCUs execute different calculation processing at normal times and perform more advanced recognition and formulation of the action plan. When an abnormality occurs in either power supply or MCU, degeneration control is executed in either one MCU. Therefore, in a case where the duplication configuration including up to the power supply is adopted so as to satisfy the specifications of autonomous driving of Level 3 or higher, it is not necessary to provide a plurality of MCUs having the same configurations, it is possible to achieve the duplication configuration with the MCU in which the functions are shared without increasing the number of MCUs, and it is possible to reduce the component cost and the manufacturing cost.

Since the MCU 1 (201) executes calculation processing for autonomous driving (AD), and the MCU 2 (202) executes calculation processing for assisting the autonomous driving calculation by the MCU 1 (201) or calculation processing for driving assistance (ADAS), it is possible to achieve a duplication configuration including a power supply system without providing a plurality of MCUs having the same configurations.

When the MCU 1 (201) fails, the MCU 2 (202) executes calculation processing for driving assistance, and thus it is possible to guide the vehicle to stop safely even at the time of MCU failure.

When the MCU 2 (202) fails, using the external information acquired by the autonomous driving sensor 101, the MCU 1 (201) executes calculation processing of degenerated vehicle control, and executes vehicle control with a limited function, whereby it is possible to safely stop the vehicle even at the time of MCU failure.

When the MCU 2 (202) is executing calculation processing for driving assistance, the MCU 1 (201) verifies the calculation processing for driving assistance by the MCU 2 (202), and thus, it is possible to detect an abnormality of the MCU 2 (202) and achieve safer driving assistance.

When at least one of the MCUs 201 and 202 fails, an MCU in a normal state performs the degeneration operation of controlling driving using only the map information, whereby it is possible to continue travel without stopping the vehicle even when the MCU fails. Therefore, it is possible to cause the vehicle to travel while avoiding stop at a location where it is dangerous to stop. It is possible to continue travel even when it is difficult to recognize the external such as a dark outside.

When at least one of the MCUs 201 and 202 fails, using the external information acquired by the external sensors 101 and 102, an MCU in a normal state executes calculation processing of degenerated vehicle control that searches for a stopping location, and therefore it is possible to stop the vehicle without affecting other vehicles even when the MCU fails.

The present invention is not limited to the above-described examples but includes various modifications and equivalent configurations within the scope of the appended claims. For example, the above-described examples have been described in detail for the purpose of explaining the present invention in an easy-to-understand manner, and the present invention is not necessarily limited to those including all the configurations described above. The configuration of a certain example may be replaced partly by the configuration of another example. The configuration of another example may be added to the configuration of a certain example. Another configuration may be added to, deleted from, or substituted for a part of the configuration of each example.

Some or all of the above-described configurations, functions, processing units, processing means, and the like may be achieved by hardware by being designed as an integrated circuit or the like, or may be achieved by software by a processor interpreting and executing a program for achieving each function.

Information such as a program, a table, and a file for achieving each function can be stored in a storage device such as a memory, a hard disk, and a solid state drive (SSD), or a recording medium such as an IC card, an SD card, and a DVD.

Control lines and information lines that are considered necessary for the description are illustrated, and not necessarily all the control lines and information lines essential for implementation are illustrated. In reality, almost all the configurations may be considered mutually connected.

REFERENCE SIGNS LIST

101 autonomous driving sensor
102 driving assistance system sensor
103 autonomous driving ECU 104 advanced driving assistance system ECU
105 vehicle control ECU
106 motor controller
107 steering controller
108 brake controller
109 redundant steer controller
110 redundant brake controller
111 main actuator
112 redundant actuator
203 autonomous driving sensor group
205 driving assistance sensor group
301, 302 digital-analog converter
402, 501 housing

The invention claimed is:

1. A vehicle control system, comprising:
a first power supply;
a plurality of first sensors connected to the first power supply;
a first actuator connected to the first power supply;
a first calculation unit connected to the first power supply;
a second power supply:
a plurality of second sensors connected to the second power supply;
a second actuator connected to the second power supply:
a second calculation unit connected to the second power supply and communicably connected to the first calculation unit; and,
a vehicle control calculation unit connected to the first power supply and configured to control the first actuator, wherein:
the first calculation unit integrates external environment information acquired by the plurality of first sensors and external environment information acquired by plurality of second sensors, estimates a vehicle position using the integrated external environment information, creates an action plan using the estimated vehicle position, and transmits the created action plan to the vehicle control calculation unit, the vehicle control calculation unit to output control signals to the first actuator to implement the action plan,
the second calculation unit executes a calculation for driving assistance using the external environment information acquired by the plurality of second sensors, and outputs control signals to control the second actuator to operate a vehicle using a result of the calculation,
the first calculation unit executes calculation processing for autonomous driving, and the second calculation unit executes calculation processing to assist the calculation for the autonomous driving by the first calculation unit responsive to the vehicle operating in an autonomous driving mode of driving automation level 3 or higher,
the second calculation unit executes a calculation for driving assistance, and the first calculation unit verifies a result of the calculation for driving assistance executed by the second calculation unit responsive to the vehicle operating with driving assistance of driving automation level 2 or lower,
the second calculation unit executes calculation processing of degenerated vehicle control for driving assistance responsive to the first calculation unit failing, and
the first calculation unit executes calculation processing of degenerated vehicle control using external information acquired by the plurality of first sensors responsive to the second calculation unit failing.

2. The vehicle control system according to claim 1, wherein
at least one of the first calculation unit or the second calculation unit in a normal state performs degeneration operation of controlling driving using only map information, responsive to at least one of the first calculation unit or the second calculation unit failing.

3. The vehicle control system according to claim 1, wherein
the second calculation unit executes, as degenerate vehicle control, a calculation process of vehicle control for searching for a stopping place by using the external environment information acquired by the plurality of second sensors responsive to the first calculation unit failing, and
the first calculation unit performs calculation processing for vehicle control to search for a stopping location using the external environment information acquired by the plurality of first sensors as the degenerate vehicle control responsive to the second calculation unit failing.

4. An electronic control device mounted on the vehicle control system according to claim 1, the electronic control device comprising the first calculation unit and the second calculation unit.

5. An electronic control device mounted on the vehicle control system according to claim 1, the electronic control device comprising the first calculation unit and the vehicle control calculation unit.

* * * * *